(12) United States Patent
Barazani

(10) Patent No.: US 6,234,727 B1
(45) Date of Patent: May 22, 2001

(54) RESILIENT CLAMPING MECHANISM FOR INSERTS

(75) Inventor: Gideon Barazani, Kiriat Bialik (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 09/419,623

(22) Filed: Oct. 18, 1999

(30) Foreign Application Priority Data

Nov. 22, 1998 (IL) .......................................................... 127192

(51) Int. Cl.[7] .............................. B26D 1/03; B26D 1/143
(52) U.S. Cl. .............................. 407/117; 407/110; 407/50; 407/72; 83/845
(58) Field of Search ...................................... 407/117, 110, 407/109, 108, 50, 33, 66, 72, 42, 35; 83/845

(56) References Cited

U.S. PATENT DOCUMENTS

| | | |
|---|---|---|
| 3,785,021 | 1/1974 | Norgren . |
| 4,580,930 | 4/1986 | Zinner . |
| 5,035,545 * | 7/1991 | Zinner .................................. 407/110 |
| 5,059,068 | 10/1991 | Scott . |
| 5,211,516 * | 5/1993 | Kress et al. ............................. 407/49 |
| 5,439,327 * | 8/1995 | Wertheim ............................... 407/117 |
| 5,524,518 * | 6/1996 | Sundstrom .............................. 83/845 |
| 5,743,680 | 4/1998 | Von Haas et al. . |
| 5,795,109 * | 8/1998 | Jonsson et al. .......................... 407/72 |
| 5,934,843 * | 8/1999 | Brask et al. ............................ 407/110 |
| 5,988,952 * | 11/1999 | Antoun ................................. 407/107 |

FOREIGN PATENT DOCUMENTS

| | | | |
|---|---|---|---|
| 152729 * | 8/1985 | (EP) | ...................................... 407/110 |

* cited by examiner

Primary Examiner—A. L. Wellington
Assistant Examiner—Erica Ergenbright
(74) Attorney, Agent, or Firm—Pennie & Edmonds LLP

(57) ABSTRACT

A cutting insert clamping mechanism for use in a cutting tool. The cutting tool has a body portion and a clamping portion. The clamping portion includes a base jaw and a clamping jaw. The clamping jaw has on its lower side a forward clamping surface separated by a recess from a rearward clamping surface. A first narrow bridge section connects the clamping jaw to the body portion of the cutting tool. A second narrow bridge section extends generally towards the rearward clamping surface. As a result of the two narrow bridge sections, the forward and rearward clamping surfaces can resiliently bend independently, and thereby are capable of applying independent clamping forces to the insert.

39 Claims, 5 Drawing Sheets

RESILIENT CLAMPING MECHANISM FOR INSERTS

FIELD OF THE INVENTION

The invention relates to a resilient clamping mechanism for an insert-receiving pocket of a cutting tool.

BACKGROUND OF THE INVENTION

Cutting tools employing a resilient clamping mechanism for clamping cutting inserts are generally of relatively narrow thickness. For example, cutting operations such as grooving and parting off can be performed by a cutting insert retained in an insert pocket located between the clamping surfaces of upper and lower jaws of a relatively narrow holder blade. The holder blade is, in turn, generally clamped in a blade-retaining block. The holder blade is generally provided with a suitably designed opening, in the vicinity of the insert pocket whereby a relatively narrow bridging portion is formed enabling a limited degree of resilient displacement of one of the holder blade's jaws relative to the other. Generally, the lower jaw is rigid and the upper jaw is resiliently displaceable. The opening can be of the form of an aperture, or a slot, or a slot terminating in an aperture. Examples of such cutting tools are disclosed in U.S. Pat. No. 3,785,021 and U.S. Pat. No. 4,580,930. A rotary slot-cutting tool employing a resilient insert clamping mechanism is disclosed in U.S. Pat. No. 5,059,068. The cutter body is disc-shaped and of relatively narrow thickness, with cutting insert pockets located around its periphery. As with the holder blade, an insert pocket has two jaws between which an insert is clamped by means of the resilient force resulting from the bending of the clamping jaw.

Whether the cutting tool is a holder blade or a rotary slot cutting tool, the bending of the clamping jaw is obtained by manufacturing the insert pocket such that the distance between the clamping surfaces of the jaws is smaller than the height of the portion of the insert located between the clamping surfaces. Consequently, when an insert is located in the insert pocket, the clamping jaw is held in a bent position creating an elastic force by means of which the insert is clamped in position.

A well-known disadvantage of this form of clamping mechanism is the instability of the clamped cutting insert in certain cutting tools and under certain cutting conditions. In rotary slot cutting tools, each individual cutting insert intermittently makes contact with a workpiece as the tool rotates about its axis of rotation. As a result a cutting insert suffers a blow each time it hits the workpiece and is likely to be displaced due to a diminishing of the clamping force. If only some of the inserts are so displaced, or they are displaced by different radial distances, then the undisplaced ones, or the less displaced ones, will stop participating in the slotting operation causing uneven wear of the inserts. Instability of the cutting insert also arises in the use of inserts retained in holder blades in, for example, grooving operations. When the holder blade is pulled out from a completed groove the insert can be accidentally be pulled out of the holder blade.

A solution to this problem is proposed in U.S. Pat. No. 5,743,680 which discloses a specially designed cutting insert and a correspondingly specially designed insert pocket in the holder blade. Similarly, a solution to the problem of insert instability in rotary slot cutting tools is proposed in U.S. Pat. No. 5,059,068 in which specially designed inserts and correspondingly specially designed insert pockets in the cutter body are disclosed.

It is the object of the present invention to provide a resilient clamping mechanism for insert, which, inter alia, overcomes the aforementioned problem of possible displacement of an insert in a reliable and novel manner.

SUMMARY OF THE INVENTION

In accordance with the present invention there is provided for use in a cutting tool, the cutting tool comprising a body portion and a clamping portion, a cutting insert clamping mechanism comprising:

a base jaw;

a clamping jaw having an upper side and a lower side, the base jaw and the clamping jaw having a gap between them forming an insert receiving pocket;

an aperture extending in a generally upward and forward direction from a rear upper section of the insert receiving pocket;

a first narrow bridge section connecting the clamping jaw to the body portion of the cutting tool; and a second narrow bridge section extending generally towards the second clamping surface.

In accordance with one embodiment of the invention, the lower side of the clamping jaw comprises a forward first clamping surface separated by a recess from a rearward second clamping surface.

Typically, the first narrow bridge section is situated generally between the aperture and the upper side of the clamping jaw.

Further typically, the second narrow bridge section is generally situated between the recess and the aperture.

Preferably, the forward portion of the aperture is located further forward than the second clamping surface.

In accordance with the present invention, a first resilience axis of rotation is associated with the first narrow bridge section and a second resilience axis of rotation is associated with the second narrow bridge section.

Generally, a first clamping force is associated with the first clamping surface and a second clamping force is associated with the second clamping surface.

Preferably, the first clamping force is independent of the second clamping force.

In accordance with one specific embodiment of the invention, an elongated slot extends from a rear section of the aperture in a generally rearward direction into a connecting block and a clamping screw extends downwards in the connecting block across the elongated slot.

If desired, the insert receiving pocket is provided with an aperture for receiving an insert-removing device, the aperture extending from a rear section of the insert receiving pocket in a generally rearward direction.

Further if desired, a rear section of the insert receiving pocket is provided with a protuberance extending from the body portion of the cutting tool, the protuberance having a front side constituting an insert location surface.

Still further if desired, the clamping jaw of the cutting insert clamping mechanism further comprises a front side intermediate between the upper and lower sides thereof, the front side constituting an insert location surface.

In accordance with one application, the cutting tool is a rotary slot cutting tool.

In accordance with another application, the cutting tool is a lathe tool with a body portion comprising a holder blade.

If desired, a cutting insert retained in the insert receiving pocket comprises an upper abutting surface and a lower abutting surface, the upper abutting surface comprising a forward first abutting surface separated by an upper surface recess from a rearward second abutting surface.

In accordance with one specific embodiment, the rearward second clamping surface of the lower side of the clamping jaw abuts a rear region of the upper surface recess of the cutting insert retained in the insert receiving pocket.

In accordance another embodiment of the invention, the lower side of the clamping jaw is not provided with a recess. In accordance with this embodiment a cutting insert provided with an upper surface recess in its upper abutting surface is used in the cutting tool.

In accordance with this embodiment, the lower side of the clamping jaw abuts the forward first abutting surface and the rearward second abutting surface at a forward first clamping region and rearward second clamping region, respectively.

Generally, a first clamping force is associated with the forward first clamping region and a second clamping force is associated with the rearward second clamping region.

If desired, the first clamping force can be arranged to be independent of the second clamping force.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
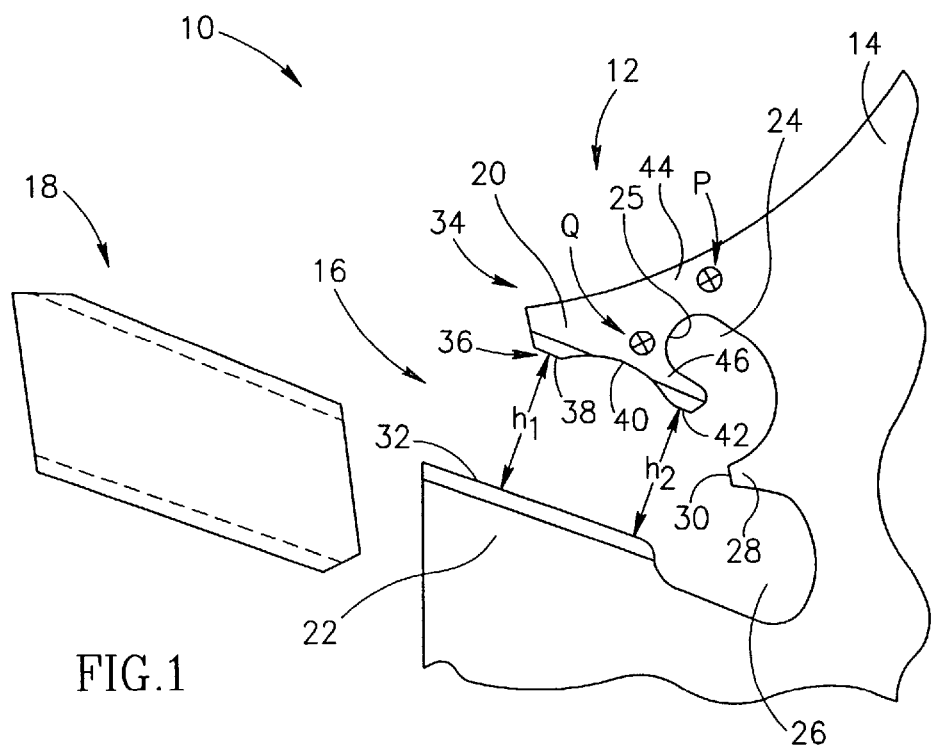
FIG. 1 is a partial side view of a cutting tool showing an insert pocket clamping mechanism in accordance with a first embodiment of the present invention and an insert for retaining therein.

Attention is first drawn to FIG. 1. A cutting tool 10 comprises a clamping portion 12 and a body portion 14. Formed in the clamping portion 12 is an insert receiving pocket 16 for receiving a cutting insert 18. The insert receiving pocket 16 is situated between a clamping jaw 20 and a base jaw 22 and has an insert pocket opening at a leading end thereof. Extending from an upper rear portion of the insert receiving pocket in a generally upward and forward direction is an aperture 24 having a forward portion 25. As will be described in greater detail below, the aperture 24 is an essential feature of the invention.

A further aperture 26 extends from the rear of the insert receiving pocket 16, in a generally rearward direction. This further aperture is for receiving an insert-removing device. The insert-removing device can, for example, be an extractor for forcing the insert out of the insert receiving pocket. Alternatively, the insert-removing device could be a key for opening the insert receiving pocket (see, for example, U.S. Pat. No. 5,803,675). However, other arrangements for opening the insert receiving pocket can be used (see, for example, U.S. Pat. No. 5,697,271), in which case the aperture 26 can be reduced to a minimal size, sufficient to provide clearance between its perimeter and an insert retained in the insert receiving pocket. The apertures 24 and 26 are separated by a protuberance 28 having a front side 30, constituting an insert location surface.

The base jaw 22 has an insert abutment surface 32, and the clamping jaw 20 has an upper side 34 and a lower side 36. The lower side comprises a forward first clamping surface 38 separated by a recess 40 from a rearward second clamping surface 42. It should be noted that the forward portion 25 of the aperture 24 is shown to be located further forward than the second clamping surface 42. However, the amount by which the forward portion 25 is further forward than the second clamping surface 42 is a question of optimal design. Although the forward portion 25 should not be rearward of the second clamping surface 42, it can, in a limiting case, be aligned with it. That is, in the limiting case, the forward portion 25 could be directly above the second clamping surface 42 in FIG. 1.

The clamping jaw 20 has a first narrow bridge section 44 connecting the clamping jaw 20 to the body portion 14 of the cutting tool 10. The first narrow bridge section 44 is situated generally between the aperture 24 and the upper side 34 of the clamping jaw 20. A second narrow bridge section 46 extends generally towards the second clamping surface 42. The second narrow bridge section 46 is generally situated between the recess 40 and the aperture 24. The two narrow bridge sections 44 and 46 are essential to the clamping mechanism of the present invention and, as will be explained in greater detail below, provide the means for ensuring that the insert 18, when inserted in the insert receiving pocket 16, will not only be clamped by both the forward first clamping surface 38 and the rearward second clamping surface 42 but will also be stably clamped.

Figure 2:
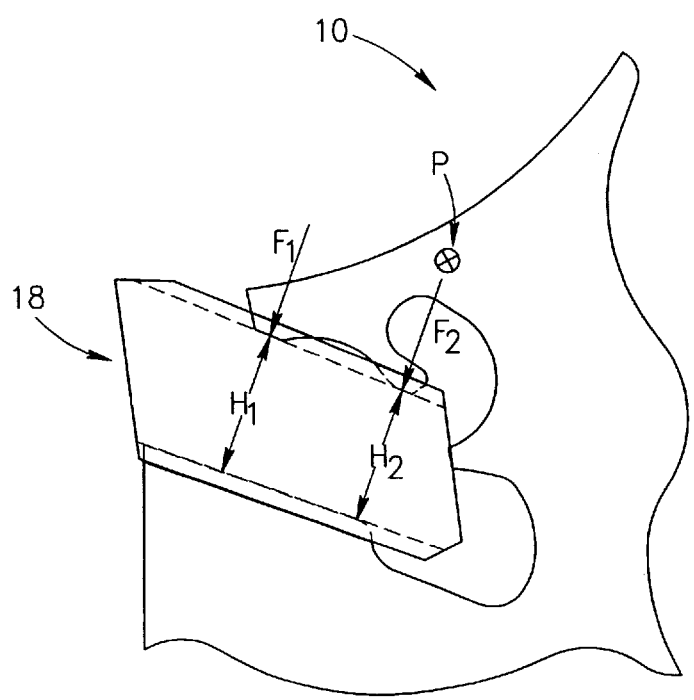
FIG. 2 is a partial side view of the cutting tool of FIG. 1 with an insert retained in the insert pocket.

The clamping action of the clamping jaw 20 will now be considered with reference to FIG. 1 and FIG. 2. In order to ensure clamping of the insert 18, the distance $h_1$ between the first clamping surface 38 and the insert abutment surface 32 of the base jaw without the insert inserted in the insert receiving pocket 16, is less than the height $H_1$ of the insert taken at the point where the first clamping surface 38 would abut the insert with the insert inserted in the insert receiving pocket. Similarly, the distance $h_2$ between the second clamping surface 42 and the insert abutment surface 32 of the base jaw without the insert inserted in the insert receiving pocket 16, is less than the height $H_2$ of the insert taken at the point where the second clamping surface 42 would abut the insert with the insert inserted in the insert receiving pocket. This being the case, when the insert is forceably inserted into the insert receiving pocket 16, the first clamping surface 38 and the second clamping surface 42 are forced further away from the insert abutment surface 32 resulting in a resilient clamping force exerted by the clamping jaw 20 on the insert 18 at two contact points, one at the first clamping surface 38 and the other at the second clamping surface 42. It will be appreciated that the word "point", in this context, actually refers to a small region, and not to a point in the mathematical sense. It should be noted that $H_2$ can be less than, or equal to, $H_1$.

The two narrow bridge sections 44 and 46 give rise to two spaced apart resilience axes of rotation P and Q. The term narrow implies that the resulting structure is afforded resilient bending. The question of how narrow the bridge sections are and the corresponding degree of resilient bending is a question of optimal design taking into consideration the required strength of the narrow bridge sections and the required clamping forces. The first clamping surface 38 can be resiliently displaced about the resilience axis of rotation P, whereas the second clamping surface 42 can independently be resiliently displaced about the resilience axis of rotation Q. Consequently, the first clamping surface 38 exerts a first force $F_1$, on a forward portion of the upper surface of the insert 18, whilst the second clamping surface 42 exerts a second force $F_2$ on a rearward portion of the upper surface of the insert. This is in contrast to most prior art cutting tools with resilient clamping mechanisms that have clamping jaws with straight clamping surfaces, in which the clamping is designed to act over the length of an abutment surface, but due to manufacturing tolerances, in most cases, the clamping force is actually applied on the insert at one point only, generally towards the front of the insert.

It should be noted that the first narrow bridge section 44 is preferably designed so that the resilience axis of rotation P lies on the line of action of second force $F_2$. The line of action is represented by the arrow at the second clamping surface 42. With this arrangement, the second clamping surface 42 is free to move about the resilience axis of rotation Q without altering the magnitude of the force $F_1$ that first clamping surface 38 exerts on the insert abutment surface 32. Therefore, with this arrangement, the first and second forces $F_1$ and $F_2$, respectively, are independent of each other. If the resilience axis of rotation P does not lie on the line of action of the second force $F_2$, but close thereto, then the first and second forces $F_1$ and $F_2$, respectively, will not be completely independent of each other. The degree of independence depending on the closeness of the resilience axis of rotation P to the line of action of the second force $F_2$.

It will be appreciated, from the above, that the aperture 24 plays an essential role in the clamping mechanism of the present invention in that its presence and shape is integral to the formation of the two narrow bridge sections 44 and 46. This is in contrast to the clamping mechanism disclosed in U.S. Pat. No. 5,743,680. Although there is also an aperture to the rear of the clamping jaw in the '680 patent (marked 108 in FIG. 8 therein), this aperture has a circular profile and does not have a forward portion located further forward than the second clamping surface (marked 105 in '680), and therefore no narrow bridge sections are formed by this aperture.

The arrangement, of two independent, or substantially independent, clamping forces, in accordance with the present invention, adds to the stability of the clamped insert. For example, in rotary slot cutting tools the clamping force can become very small due to vibrations. In prior art rotary slot cutting tools in which the clamping force is applied on the insert at one point only this means that the insert can slide out of the insert receiving pocket under the influence of centrifugal forces. In accordance with the present invention, if the force $F_1$ that first clamping surface 38 exerts on the insert abutment surface 32 become very small due to vibrations then the insert will still be clamped in position by means of the force $F_2$ that second clamping surface 42 exerts on the insert abutment surface 32. The clamping mechanism of the present invention also adds to the stability of the insert against the influence of side forces (i.e., forces substantially perpendicular to the plane of the figures).

It is further pointed out that although in U.S. Pat. No. 5,743,680 the clamping arm has two clamping contact surfaces, there is only one resilience axis of rotation, which is associated with an extension of the slot which follows immediately after the oval recess extending from the slot shaped recess for receiving a cutting insert. Therefore, the two clamping contact surfaces of the metal removing tool of '680 are not free to resiliently bend independently and consequently, the two clamping contact surfaces do not exert forces on the insert that are independent of each other. Furthermore, the cutting insert intended for use with the metal removing tool of '680 has a specially configured upper side, with three partial surfaces inclined to each other at certain given angles, which lie in certain given angular ranges.

Figures 3A, 3B:
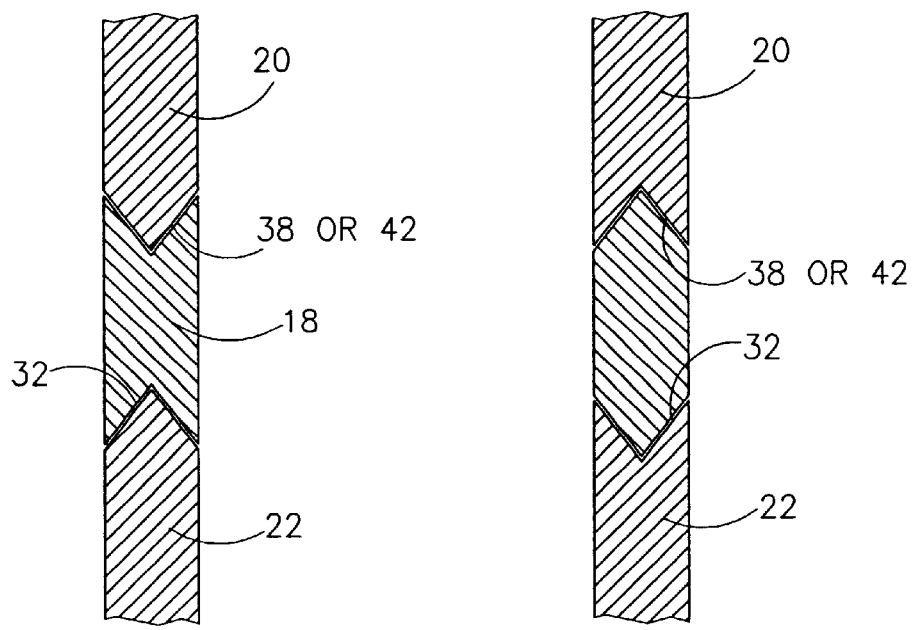
FIGS. 3A is a partial cross sectional view of the cutting tool of FIG. 2 in a plane perpendicular to the plane of the figure and passing through either the forward first clamping surface, or the rearward second clamping surface of the cutting tool and showing the mechanism for preventing lateral movement of an insert having concave V-shaped cross-sectional surfaces.
FIGS. 3B is similar to FIG. 3A but for an insert having convex V-shaped cross-sectional surfaces.

Attention is now drawn to FIGS. 3A, showing the mechanism for preventing lateral movement of the insert 18 with respect to the cutting tool 10. As is well known in the art (see, for example, U.S. Pat. No. 4,580,930 and U.S. Pat. No. 4,887,945) lateral stability of the insert can be achieved by forming the clamping surfaces 38 and 42 of the clamping jaw 20, and the abutment surface 32 of the base jaw 22, to have cross sectional shapes that mate the corresponding abutted surfaces of the insert. In accordance with one embodiment of the present invention, the clamping surfaces 38 and 42 of the clamping jaw 20, and the abutment surface 32 of the base jaw 22 have convex V-shaped cross-sections, and the upper and lower surfaces of the insert 18 have mating concave V-shaped cross-sectional surfaces. FIG. 3B shows the mechanism for preventing lateral movement of the insert 18 in accordance with another embodiment of the present invention, in which the clamping surfaces 38 and 42 of the clamping jaw 20, and the abutment surface 32 of the base jaw 22 have concave V-shaped cross-sections, and the upper and lower surfaces of the insert 18 have mating convex V-shaped cross-sectional surfaces.

Figure 4:
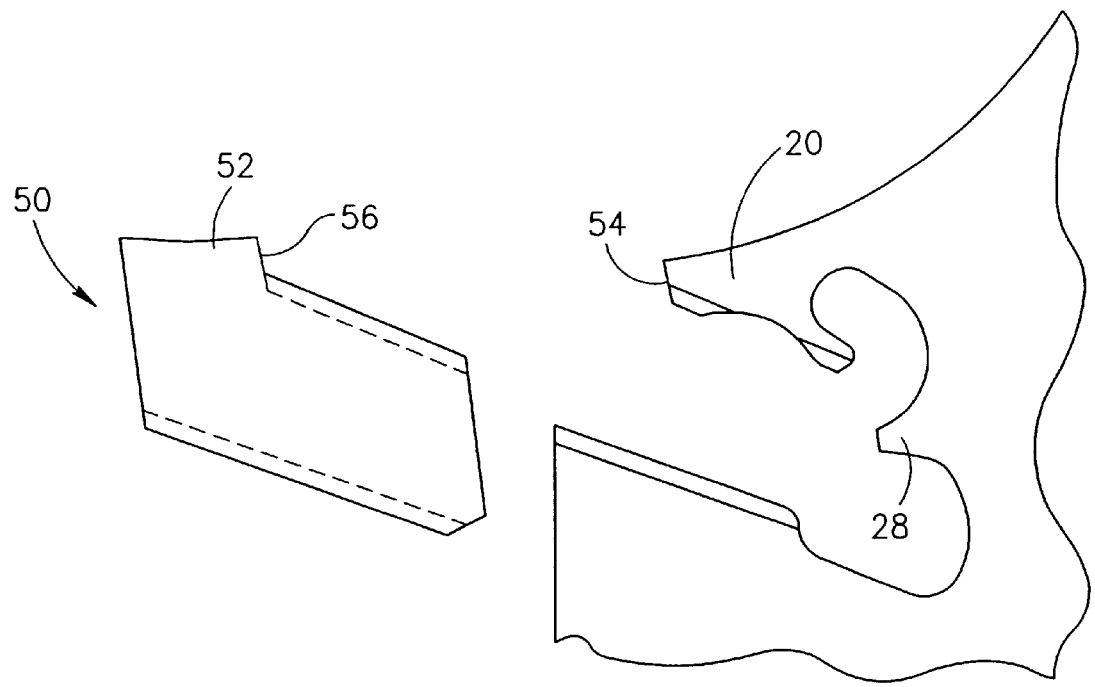
FIG. 4 is a partial side view of a cutting tool showing an insert and insert pocket clamping mechanism in accordance with the first embodiment of the present invention with an alternative arrangement for locating the insert in the insert receiving pocket.

In the embodiment shown in FIGS. 1 and 2 the insert 18 is inserted in the insert receiving pocket 16 until the rear end of the insert engages the insert location surface 30 of the protuberance 28. However, there are inserts, such as the insert 50 shown in FIG. 4, that have a nose-like member 52 protruding from the upper surface of the insert. In this case, an alternative arrangement for locating the insert in the insert receiving pocket can be used, with the front side 54 of the clamping jaw 20 serving as an insert location surface. The insert is inserted into the insert receiving pocket until the rear side 56 of the nose-like member 52 engages the front side 54 of the clamping jaw. In accordance with this alternative arrangement, and in order to ensure abutment between the rear side 56 of the nose-like member 52 and the front side 54 of the clamping jaw 20, either the protuberance 28 in FIG. 4 is shorter than that shown in FIGS. 1 and 2, or the insert shown in FIG. 4 is shorter than the insert shown in FIGS. 1 and 2. However, if the aperture 26 is reduced to a minimal size, as previously described, then in accordance with this alternative embodiment it is also possible to do away with the protuberance 28 completely.

Figure 5:
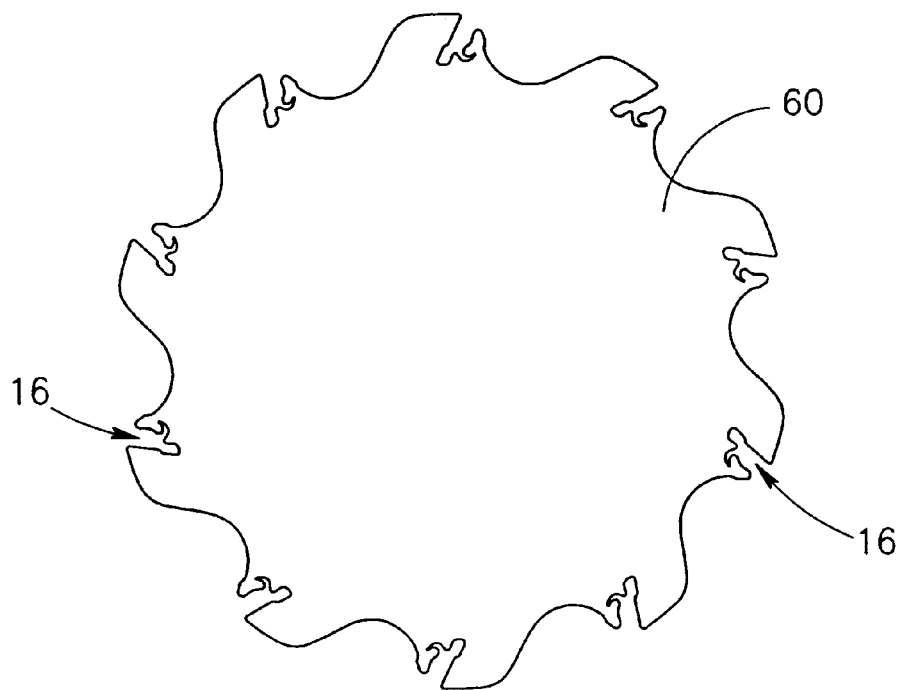
FIG. 5 is a side view of a rotary slot cutting tool having a cutting insert clamping mechanism in accordance with the present invention.
Figure 6:
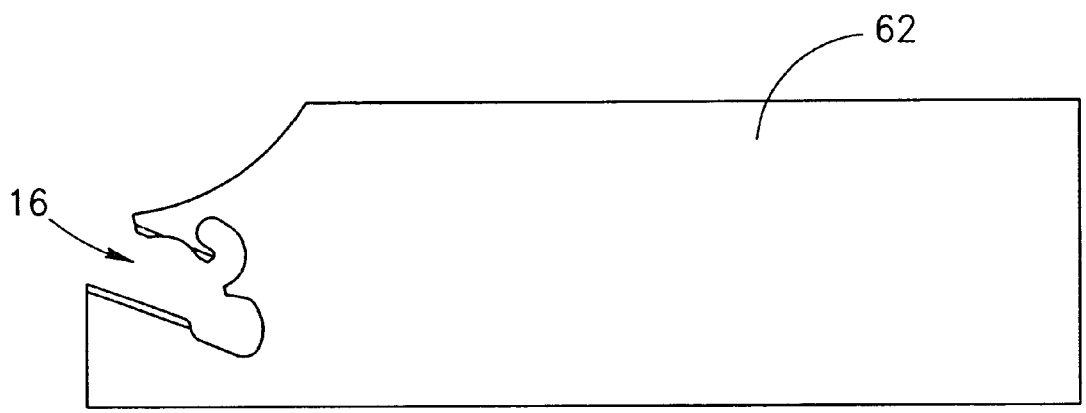
FIG. 6 is a side view of a holder blade having a cutting insert clamping mechanism in accordance with the present invention.

The cutting insert clamping mechanism of the present invention can be employed by any cutting tool having a body portion of relatively narrow thickness and of a material capable of resilient bending. FIG. 5 shows a rotary slot-cutting tool 60 with a plurality of insert receiving pockets 16 arranged around the periphery of the tool, each insert receiving pocket employing the cutting insert clamping mechanism of the present invention. FIG. 6 shows a holder blade 62, for cutting operations such as grooving and parting off, with an insert receiving pocket 16 employing the cutting insert clamping mechanism of the present invention.

Figure 7:
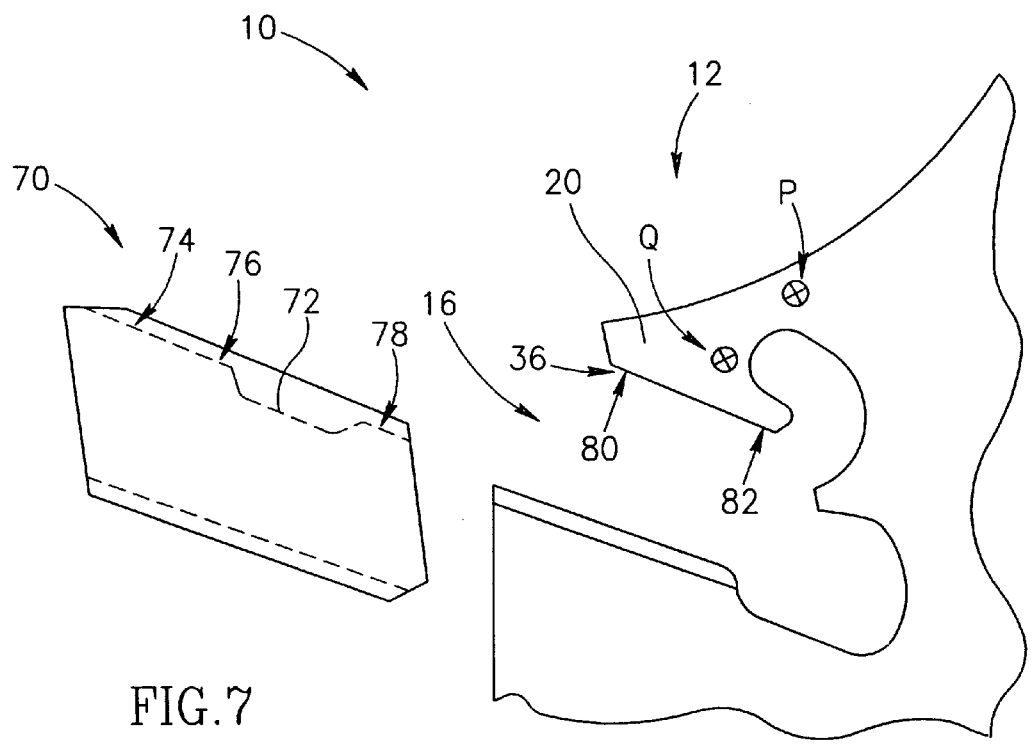
FIG. 7 is a partial side view of a cutting tool showing an insert pocket clamping mechanism in accordance with a second embodiment of the present invention and an insert for retaining therein.
Figure 8:
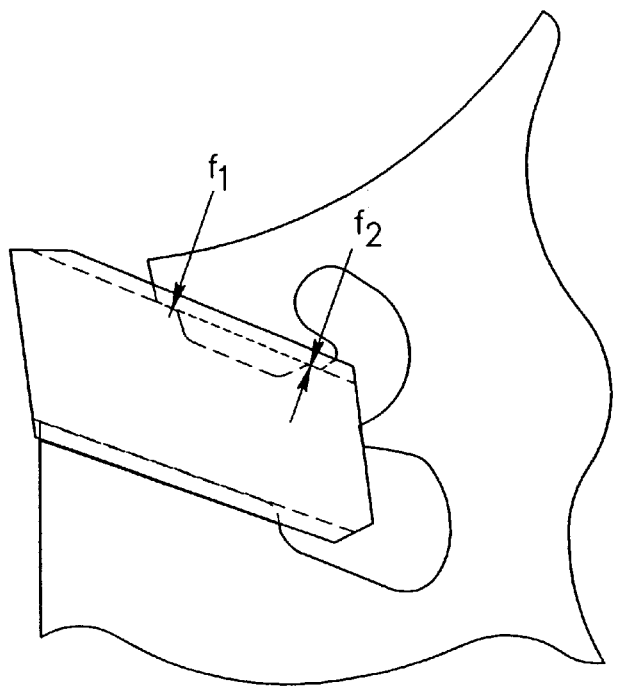
FIG. 8 is a partial side view of the cutting tool of FIG. 7 with an insert retained in the insert pocket.

In accordance with the first embodiment of the invention there is a recess 40 in the lower side 36 of the clamping jaw 20 of the clamping portion 12 of the cutting tool 10 (see, for example, FIG. 1). The recess 40 is essential to the definition of the first and second clamping surfaces 38 and 42, respectively. In accordance with a second embodiment of the present invention, shown in FIGS. 7 and 8, there is no recess in the lower side 36 of the clamping jaw 20 of the clamping portion 12 of the cutting tool 10. Instead, the insert 70 has an upper surface recess 72 in its upper abutting surface 74. The upper surface recess divides the upper abutting surface 74 into a forward first abutting surface 76 and a rearward second abutting surface 78. Corresponding to the forward first abutting surface 76 and the rearward second abutting surface 78 on the upper abutting surface 74 of the insert 70 is a forward first clamping region 80 and a rearward second clamping region 82 on the lower side 36 of the clamping jaw 20. Consequently, when the insert 70 is fully inserted into the insert receiving pocket 16, as shown in FIG. 8, the forward first clamping region 80 abuts the forward first abutting surface 76 with a first clamping force $f_1$ and the rearward second clamping region 82 abuts the rearward second abutting surface 78 with a second clamping force $f_2$. As with the first embodiment, the clamping jaw can be so designed that the resilience axis of rotation P lies on the line of action of second force $F_2$. With this arrangement, the second clamping region 82 is free to move about the resilience axis of rotation Q without altering the magnitude of the force $f_1$ that first clamping region 80 exerts on the first abutting surface 76. Therefore, with this arrangement, the first and second forces $f_1$ and $f_2$, respectively, are independent of each other.

The clamping mechanism of the present invention has been described above with respect to a "self-grip" type arrangement wherein the clamping jaw is forced towards the base jaw by means of resilient displacement of the clamping jaw. Attention is now drawn to FIGS. 9 to 12, showing the clamping mechanism of the present invention wherein the clamping jaw is activated by a clamping screw.

Figure 9:
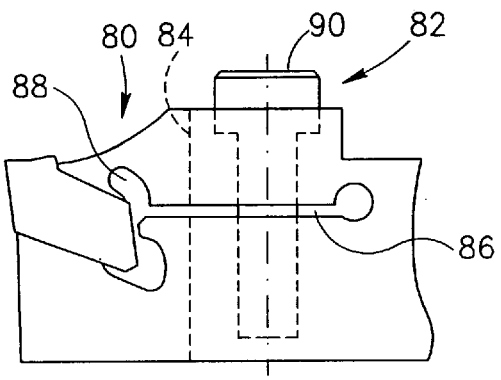
FIG. 9 is a partial side view of a cutting tool with an insert of the type shown in FIG. 4 retained in the insert pocket, wherein the clamping jaw is activated by a clamping screw.
Figure 10:
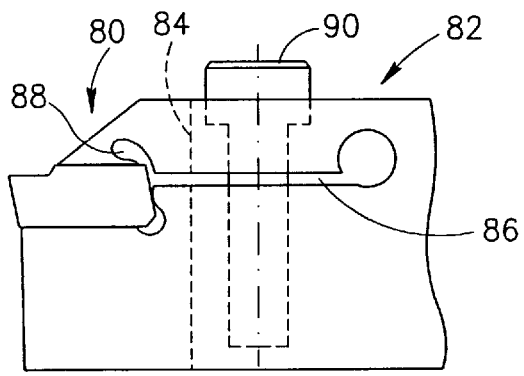
FIG. 10 is a partial side view of a cutting tool with an insert having parallel upper and lower abutting surfaces retained in the insert pocket, wherein the clamping jaw is activated by a clamping screw.

In FIGS. 9 to 10 the relatively thin clamping portion 80 of the cutting tool is followed by a relatively thick connecting block 82. The relatively thin clamping portion and the connecting block can also be an integral structure. Whatever the case, the vertical broken line 84 indicates the border between the two. An elongated slot 86 extends from a rear section of the aperture 88 (equivalent to aperture 24 in FIG. 1) in a generally rearward direction into the connecting block 82. A clamping screw 90 extends downwards in the connecting block across the elongated slot 86. When the clamping screw is not tightened the gap between the clamping jaw and the base jaw is maximal and the insert can be positioned in the insert pocket. As the clamping screw is tightened the clamping jaw applies forces to the insert which are increased until the insert is securely clamped in position.

Figure 11:
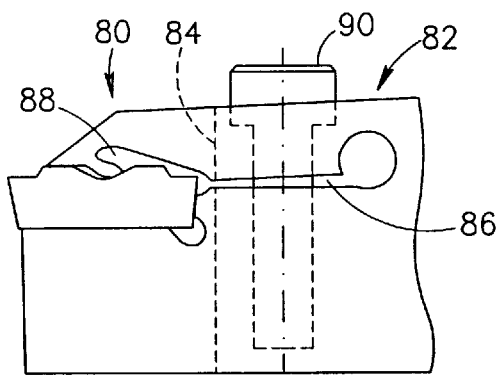
FIG. 11 is a partial side view of a cutting tool wherein the rearward second clamping surface of the lower side of the clamping jaw abuts a rear region of an upper surface recess in the upper surface of the cutting insert.
Figure 12:
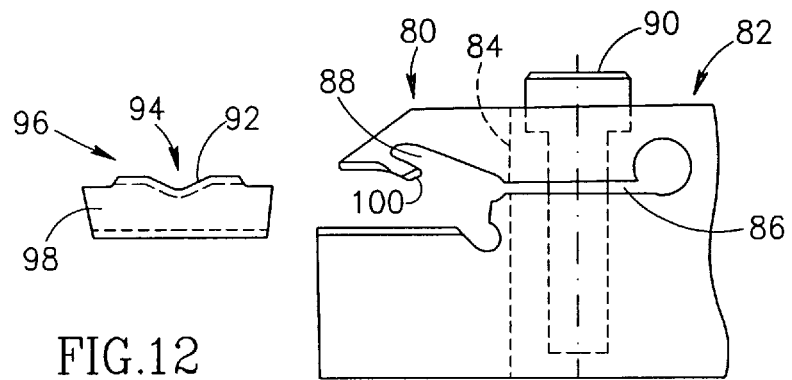
FIG. 12 is a partial side view of a cutting tool of FIG. 11 with the insert removed from the cutting tool.

FIG. 9 shows an insert with $H_1$ not equal to $H_2$ (as defined in FIG. 2), that is, the upper and lower abutting surfaces of the insert are not parallel. FIG. 10 shows an insert with $H_1$ equal to $H_2$ that is, the upper and lower abutting surfaces of the insert are parallel. FIGS. 11 and 12 show an embodiment in which a rearward second clamping surface 100 of the clamping jaw is adapted to abut a rear section 92 of an upper surface recess 94 of the upper abutting surface 96 of the insert 98. This particular arrangement adds a further safeguard against accidental dislodging of the insert.

Although the present invention has been described to a certain degree of particularity, it should be understood that various alterations and modifications can be made without departing from the spirit or scope of the invention as hereinafter claimed.

What is claimed is:

1. For use in a cutting tool, the cutting tool comprising a body portion and a clamping portion, a cutting insert clamping mechanism comprising:
   a base jaw;
   a clamping jaw having an upper side and a lower side, the lower side opposing the base jaw and comprising a forward clamping surface spaced apart from a rearward clamping surface, the base jaw and the clamping jaw having a gap between them forming an insert receiving pocket having an insert pocket opening at a leading end thereof;
   a first aperture extending from a rear section of the insert receiving pocket in a direction generally towards the upper side of the clamping jaw;
   a first narrow bridge section connecting the clamping jaw to the body portion of the cutting tool;
   a second narrow bridge section extending generally towards the rearward clamping surface;
   wherein a first resilience axis of rotation is associated with the first narrow bridge section and a second resilience axis of rotation is associated with the second narrow bridge section.

2. The cutting insert clamping mechanism in accordance with claim 1, wherein the forward clamping surface and the rearward clamping surface are separated by a first recess.

3. The cutting insert clamping mechanism in accordance with either claim 1 or claim 2, wherein the first narrow bridge section is situated generally between the first aperture and the upper side of the clamping jaw.

4. The cutting insert clamping mechanism in accordance with claim 2, wherein the second narrow bridge section is generally situated between the first recess and the first aperture.

5. The cutting insert clamping mechanism in accordance with either claim 1 or claim 2, wherein the first aperture extends further toward the leading end than does the rearward clamping surface.

6. The cutting insert clamping mechanism in accordance with claim 1, wherein a first clamping force is associated with the forward clamping surface and a second clamping force is associated with the rearward clamping surface and wherein the first clamping force is independent of the second clamping force.

7. The cutting insert clamping mechanism in accordance with either claim 1 or claim 2, wherein an elongated slot extends from a rear section of the first aperture in a direction away from the leading end into a connecting block and a clamping screw extends across the elongated slot.

8. The cutting insert clamping mechanism in accordance with either claim 1 or claim 2, wherein the insert receiving pocket is provided with a second aperture for receiving an insert-removing device, the second aperture extending from a rear section of the insert receiving pocket in a direction away from said leading end.

9. The cutting insert clamping mechanism in accordance with either claim 1 or claim 2, wherein a rear section of the insert receiving pocket is provided with a protuberance extending from the body portion of the cutting tool, the protuberance having a front side constituting an insert location surface.

10. The cutting insert clamping mechanism in accordance with either claim 1 or claim 2, wherein the clamping jaw further comprises a front side intermediate between the upper and lower side thereof, the front side constituting an insert location surface.

11. A cutting tool comprising a body portion and a clamping portion having a clamping mechanism comprising:
   a base jaw;
   a clamping jaw having an upper side and a lower side, the lower side opposing the base jaw and comprising a forward clamping surface spaced apart from a rearward clamping surface, the base jaw and the clamping jaw having a gap between them forming an insert receiving pocket having an insert pocket opening at a leading end thereof;
   a first aperture extending from a rear section of the insert receiving pocket in a direction generally towards the upper side of the clamping jaw;
   a first bridge section connecting the clamping jaw to the body portion of the cutting tool;
   a second bridge section extending generally towards the rearward clamping surface;
   wherein a first resilience axis of rotation is associated with the first bridge section and a second resilience axis of rotation is associated with the second bridge section.

12. The cutting tool according to claim 11, wherein the cutting tool is a rotary slot cutting tool having a plurality of clamping mechanisms arranged around a periphery of the body portion.

13. The cutting tool according to claim 11, wherein the cutting tool is a lathe tool and the body portion comprises a holder blade.

14. The cutting tool according to either claim 12 or claim 13, wherein the forward clamping surface and the rearward clamping surface are separated by a first recess.

15. The cutting tool according to claim 11, further comprising a cutting insert retained in the insert receiving pocket, the cutting insert having a upper abutting surface and a lower abutting surface, the upper abutting surface comprising a forward abutting surface spaced apart from a rearward abutting surface, wherein the forward clamping surface abuts the forward abutting surface at a forward clamping region, and the rearward clamping surface abuts the rearward abutting surface at a rearward clamping region.

16. The cutting tool according to claim 15, wherein the forward abutting surface and the rearward abutting surface are separated by an upper surface recess.

17. The cutting tool according to claim 15, wherein the forward clamping surface and the rearward clamping surface are separated by a first recess.

18. The cutting tool according to claim 17, wherein the forward abutting surface and the rearward abutting surface are separated by an upper surface recess.

19. The cutting tool according to claim 18, wherein the rearward clamping surface abuts a rear region of the upper surface recess of the cutting insert.

20. The cutting tool according to claim 15, wherein a first clamping force is associated with the forward clamping region and a second clamping force is associated with the rearward clamping region, the first and second clamping forces being independent of one another.

21. A cutting tool comprising having associated therewith a cutting insert clamping mechanism comprising:
   a clamping jaw and a base jaw defining therebetween an insert receiving pocket having an insert pocket opening at a leading end thereof, the clamping jaw having an upper side and a lower side, the lower side opposing the base jaw and being provided with a forward clamping surface proximate to the leading end and a rearward clamping surface spaced apart from the forward clamping surface in a rearward direction of the insert receiving pocket, away from the leading end; and
   a first aperture communicating with said insert receiving pocket at a point which is rearward of the rearward clamping surface; wherein
   the first aperture extends past the rearward clamping surface, in a forward direction of the insert receiving pocket towards the leading end.

22. The cutting tool according to claim 21, wherein
   a first bridge section connects the clamping jaw to a body portion of the cutting tool, the first bridge section being defined between the upper side of the clamping jaw and the first aperture; and
   a second bridge section extends generally towards the rearward clamping surface, the second bridge section being defined between the lower side of the clamping jaw and the first aperture.

23. The cutting tool according to claim 22, wherein a first resilience axis of rotation is associated with the first bridge section and a second resilience axis of rotation is associated with the second bridge section.

24. The cutting tool according to any one of claims 21 to 23, further comprising a cutting insert retained in the insert receiving pocket, the cutting insert having an upper abutting surface and a lower abutting surface, the upper abutting surface comprising a forward abutting surface spaced apart from a rearward abutting surface.

25. The cutting tool according to claim 24, wherein:
   the forward clamping surface abuts the forward abutting surface at a forward clamping region, and the rearward clamping surface abuts the rearward abutting surface at a rearward clamping region;
   a first clamping force is associated with the forward clamping region, and a second clamping force is associated with the rearward clamping region; and
   the first and second clamping forces are independent of one another.

26. The cutting tool according to claim 25, wherein the forward abutting surface and the rearward abutting surface are spaced apart by an upper surface recess.

27. The cutting tool according to claim 25, wherein the forward clamping surface and the rearward clamping surface are spaced apart by a first recess.

28. The cutting tool according to claim 27, wherein the forward abutting surface and the rearward abutting surface are spaced apart by an upper surface recess.

29. The cutting tool according to claim 28, wherein the rearward clamping surface abuts a rear region of the upper surface recess of the cutting insert.

30. The cutting tool according to claim 21, wherein the forward clamping surface and the rearward clamping surface are spaced apart by a first recess.

31. A cutting tool comprising having associated therewith a cutting insert clamping mechanism comprising:

a clamping jaw and a base jaw defining therebetween an insert receiving pocket having an insert pocket opening at a leading end thereof, the clamping jaw having an upper side and a lower side, the lower side opposing the base jaw and being provided with a forward clamping surface proximate to the leading end and a rearward clamping surface spaced apart from the forward clamping surface in a rearward direction of the insert receiving pocket, away from the leading end; and a first aperture communicating with said insert receiving pocket at a point which is rearward of the rearward clamping surface; wherein a first bridge section connects the clamping jaw to a body portion of the cutting tool, the first bridge section being defined between the upper side of the clamping jaw and the first aperture;

a second bridge section extends generally towards the rearward clamping surface, the second bridge section being defined between the lower side of the clamping jaw and the first aperture; and a first resilience axis of rotation is associated with the first bridge section and a second resilience axis of rotation is associated with the second bridge section.

32. The cutting tool according to claim 31, further comprising a cutting insert retained in the insert receiving pocket, the cutting insert having a upper abutting surface and a lower abutting surface, the upper abutting surface comprising a forward abutting surface spaced apart from a rearward abutting surface.

33. The cutting tool according to claim 32 wherein:

the forward clamping surface abuts the forward abutting surface at a forward clamping region, and the rearward clamping surface abuts the rearward abutting surface at a rearward clamping region;

a first clamping force is associated with the forward clamping region, and a second clamping force is associated with the rearward clamping region; and the first and second clamping forces are independent of one another.

34. The cutting tool according to claim 32, wherein the forward abutting surface and the rearward abutting surface are spaced apart by an upper surface recess.

35. The cutting tool according to claim 32, wherein the forward clamping surface and the rearward clamping surface are spaced apart by a first recess.

36. The cutting tool according to claim 35, wherein the forward abutting surface and the rearward abutting surface are spaced apart by an upper surface recess.

37. The cutting tool according to claim 36, wherein the rearward clamping surface abuts a rear region of the upper surface recess of the cutting insert.

38. The cutting tool according to claim 31, wherein the forward clamping surface and the rearward clamping surface are spaced apart by a first recess.

39. A cutting tool comprising having associated therewith a cutting insert clamping mechanism comprising:

a clamping jaw and a base jaw defining therebetween an insert receiving pocket having an insert pocket opening at a leading end thereof, the clamping jaw having an upper side and a lower side, the lower side opposing the base jaw and being provided with a forward clamping surface proximate to the leading end and a rearward clamping surface spaced apart from the forward clamping surface in a rearward direction of the insert receiving pocket, away from the leading end;

a first aperture communicating with said insert receiving pocket at a point which is rearward of the rearward clamping surface; and a cutting insert retained in the insert receiving pocket, the cutting insert having a upper abutting surface and a lower abutting surface, the upper abutting surface comprising a forward abutting surface spaced apart from a rearward abutting surface, wherein the forward clamping surface abuts the forward abutting surface at a forward clamping region, and the rearward clamping surface abuts the rearward abutting surface at a rearward clamping region;

a first clamping force is associated with the forward clamping region, and a second clamping force is associated with the rearward clamping region; and the first and second clamping forces are independent of one another.

* * * * *